Jan. 28, 1964   W. H. BUCK   3,119,170
TURRET INDEXING CONTROL DEVICE
Filed April 1, 1960   3 Sheets-Sheet 1

INVENTOR.
WILLIAM H. BUCK
BY
Woodhams Blanchard and Flynn
ATTORNEYS

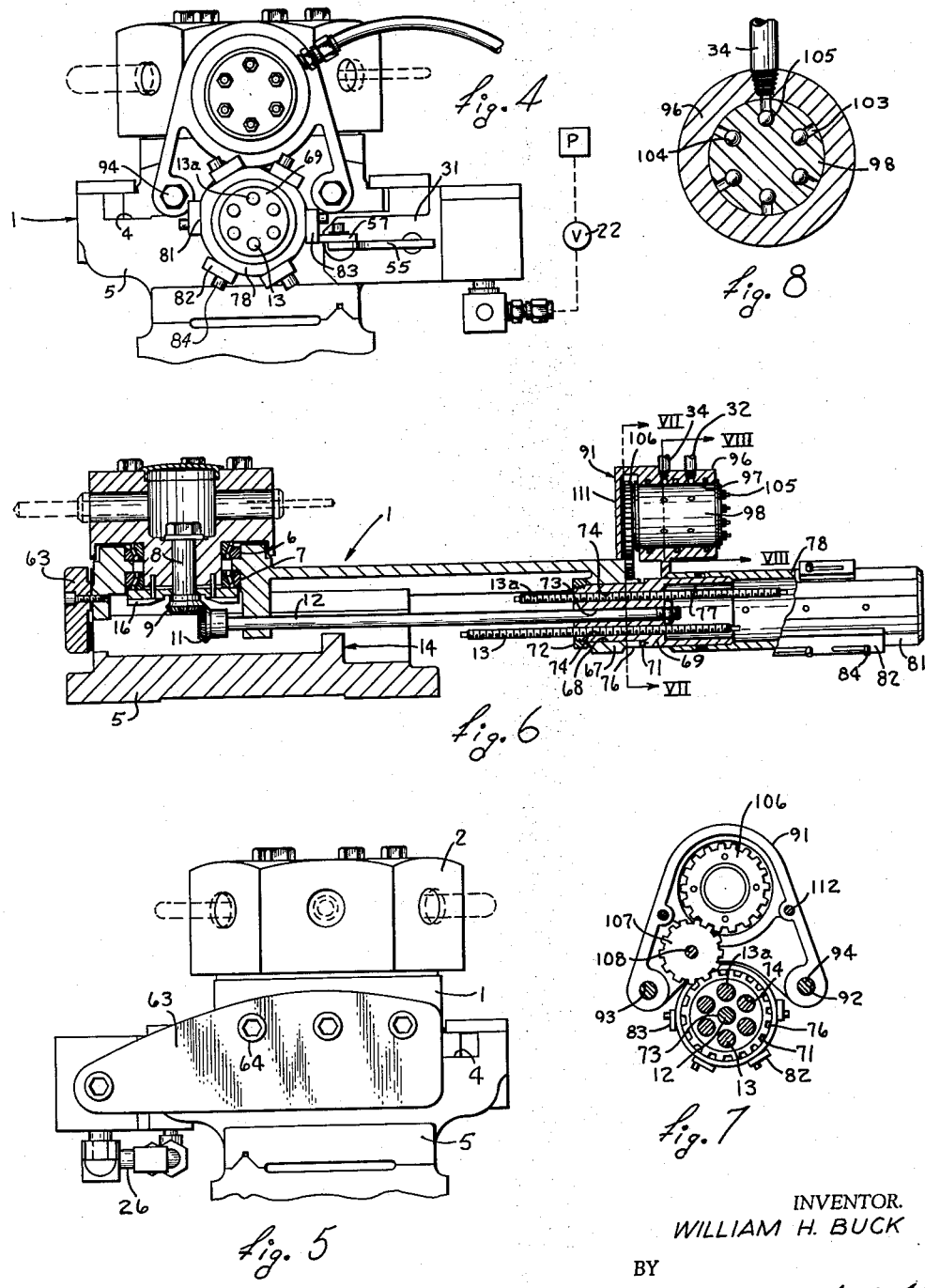

Jan. 28, 1964  W. H. BUCK  3,119,170
TURRET INDEXING CONTROL DEVICE
Filed April 1, 1960  3 Sheets-Sheet 3

INVENTOR.
WILLIAM H. BUCK
BY
Woodhams, Blanchard and Flynn
ATTORNEYS

United States Patent Office 3,119,170
Patented Jan. 28, 1964

3,119,170
TURRET INDEXING CONTROL DEVICE
William H. Buck, Portage Township, Kalamazoo County, Mich., assignor to Atlas Press Company, Kalamazoo, Mich., a corporation of Michigan
Filed Apr. 1, 1960, Ser. No. 19,340
6 Claims. (Cl. 29—42)

This invention relates to a turret-controlling device for a machine tool and it relates particularly to a hydraulic feeding apparatus wherein the relative approach of the work and the tool proceeds at various selected speeds corresponding in a predetermined manner with various positions of a turret.

While the need for the present invention arose particularly in connection with a turret lathe, and accordingly for convenience the following discussion will be primarily in terms of turret lathes, it will be recognized that the invention may also be applied to a variety of other devices and particularly a variety of other machine tools involving turrets. Thus, the present selection of a turret lathe to illustrate the invention will be recognized as being for illustrative purposes only.

In connection with feeding work with respect to a turret lathe, it frequently happens that the rate of feeding associated with one position of the turret is different from the rate of feeding associated with a different position of the turret. Further, these feed rates will almost always change from one job to another so that it is essential in designing such a machine that it be readily possible to change such feed rates, and select each feed rate, appropriately to a given position of the turret. Still further, such changing must be effected conveniently and accurately to meet whatever operating conditions are required.

This general problem has been encountered on many previous occasions and has been met in a variety of ways. However, insofar as I am aware, these previous attempts are primarily mechanical systems which have in turn required in many instances relatively complex cam and cam follower devices. These have not only been expensive to provide in the first place but also expensive to maintain in operating condition. Further, they have usually been relatively clumsy and difficult to change from one operating adjustment to another so that the set-up time for a given job is sometimes relatively long.

Accordingly, the objects of the invention are:

(1) To provide feeding control mechanism for operation in association with a turret whereby the feeding rate can be adjusted as desired with respect to different positions of the turret.

(2) To provide a device, as aforesaid, which is of relatively simple construction and hence can be provided and maintained at a minimum of expense.

(3) To provide a device as aforesaid which can be rapidly adjusted so that the feeding rates of work with respect to the tools respectively held by the turret at any desired position or positions thereof can be readily selected as desired.

(4) To provide a device as aforesaid wherein the desired selection of feeding rates as above mentioned may be made quickly and accurately by ordinary operating personnel and by the use of only simple tools.

(5) To provide apparatus as aforesaid wherein the feeding rate adopted with respect to a given position of the turret can be maintained at the preselected rate over a period of time with a high degree of accuracy.

(6) To provide a device as aforesaid in which any feeding rate can be modified at any time, and including during operation of the apparatus, as desired.

(7) To provide apparatus as aforesaid in which any given feeding rate may be made faster or slower as desired during operation of the apparatus without danger to either the apparatus or to the operator and may be made almost as easily and quickly as an adjustment made while the machine is not operating.

(8) To provide apparatus as aforesaid which can be applied with only slight modification to a variety of different types and sizes of turret lathes and to other types of machine tools utilizing turrets.

(9) To provide apparatus as aforesaid which is capable of long and trouble-free operation with a minimum of maintenance.

Other objects and purposes of the invention will become apparent to persons acquainted with apparatus of this general sort upon reading the following disclosure and inspection of the accompanying drawings.

In the drawings:

FIGURE 4 is an end view from the rightward end of the apparatus of FIGURE 2.

FIGURE 5 is an end view from the leftward end of the apparatus of FIGURE 2.

FIGURE 6 is a section taken along the line VI—VI of FIGURE 3.

FIGURE 7 is a section taken along the line VII—VII of FIGURE 6.

FIGURE 8 is a section taken along the line VIII—VIII of FIGURE 6.

In the following description, the following terminology will be used for convenience in reference however with no intention to limit.

The terms "rightward" and "leftward" will refer to rightward and leftward directions as appearing in the accompanying drawings and particularly in a figure in connection with which such reference is used.

The terms "upward" and "downward" will refer to directions in the normal position of use of the apparatus.

Figure 2:
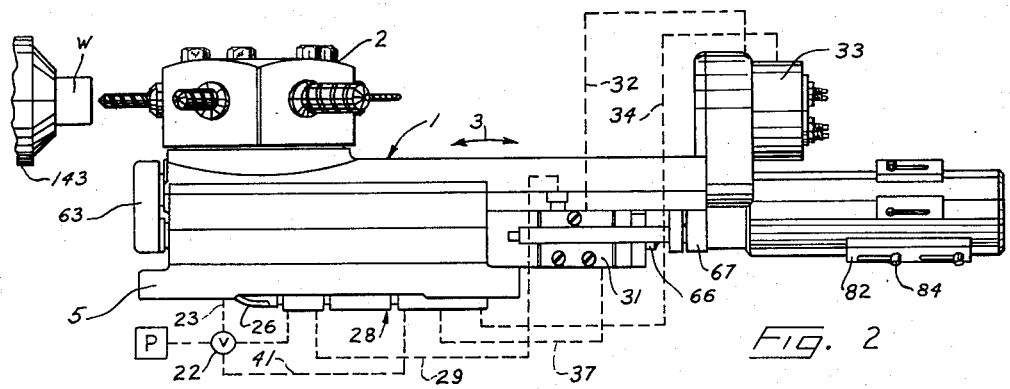
FIGURE 2 is a side view of a turret and associated apparatus embodying the invention.
Figure 3:
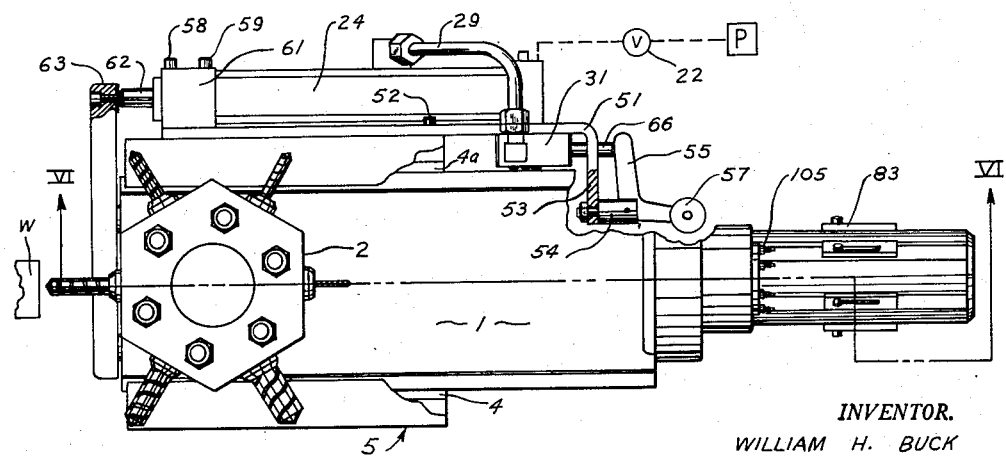
FIGURE 3 is a top view of the apparatus of FIGURE 2.

The terms "forward" and "rearward" will refer respectively to the advancing and retracting movements of the machine, the same being respectively leftward and rightward in FIGURES 2, 3 and 6.

The particular terms above mentioned include derivatives thereof and words of a generally similar import unless the context clearly requires otherwise.

General Description

In general, the invention consists of providing hydraulic means for feeding a tool-carrying turret toward a work zone and interconnecting an automatic valve with the turret so as to provide different feeding rates for the pressure fluid utilized, said rates corresponding selectively to different positions of the turret. This is accomplished by providing multiple channels in the supply for the work-feeding cylinder and means responsive to the rotation of the turret for selecting which of said channels shall be connected to the supply of pressure fluid.

Detailed Description

Inasmuch as the apparatus here chosen to illustrate the invention has been designed as an attachment for a presently standard, manually operated machine, it will be best described with reference to such a machine. Therefore, the following description will, for convenience in reference, first describe briefly one illustrative form of such standard machine and the description will then proceed to set forth in appropriate detail illustrative apparatus embodying the invention.

Referring to the drawings, the machine with which the invention is used includes a tool-carrying slide 1 which rotatably supports a turret 2 and is adapted for sliding movement reciprocatingly as indicated by the double-headed arrow 3 (FIGURE 2) toward and away from a work zone generally indicated at W. The slide 1 is supported for such reciprocating movement in the usual manner upon rails generally indicated at 4 and 4a (FIGURE 3).

Said turret 2 is supported for rotation on and by the thrust bearings 6 and 7 (FIGURE 6) and is affixed for rotation with the shaft 8. Said shaft 8 is connected through the bevel gears 9 and 11 to an indexing shaft 12.

The rearward end of the indexing shaft 12 carries, by means to be described in further detail hereinafter, a plurality of stop pins of which two appear at 13 and 13a. Said stop pins are caused to revolve around the axis of the indexing shaft 12 as said shaft rotates in response to rotation of the turret whereby a selected one of said indexing pins is brought into alignment with abutment 14 which extends upwardly in a conventional manner from the supporting base 5 of the machine.

Any convenient means, such as conventional ratchet-type means, not shown, cooperating in a known manner with a ratchet wheel 16 (FIGURE 6) are provided to effect suitable rotative movement of the turret as desired, usually indexing such movement from one station to the next with each reciprocation of the turret-carrying slide 1.

Figure 1:
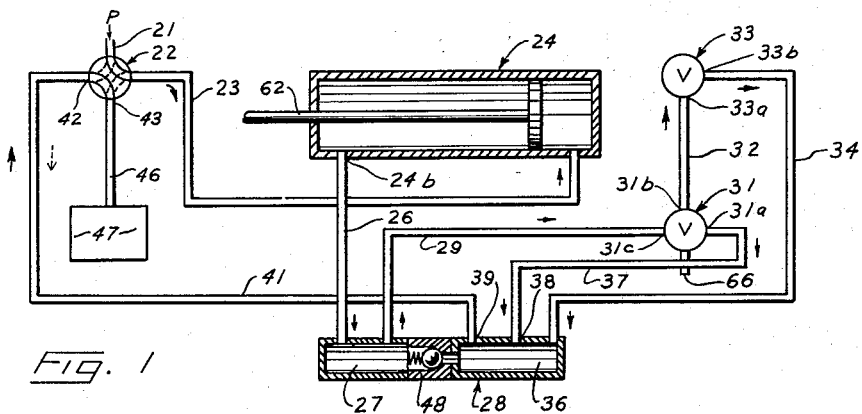
FIGURE 1 is an oil circuit diagram illustrating the system embodied by apparatus of the invention.

Turning now to the structure constituting the selected illustrative embodiment of the invention, the same can be best first summarized by reference to the hydraulic circuit diagram appearing in FIGURE 1. With this circuit clearly in mind, the subsequently described parts constituting the apparatus by which said circuit is caused to operate will become thereupon more readily understood.

Referring now to FIGURE 1, a source of hydraulic pressure fluid P of any convenient type is provided and said source is connected by a conduit 21 to a four-way cycling valve 22 which in this embodiment is manually operated but which can as desired be operated pedally or by automatic means. In the position shown in FIGURE 1, said conduit 21 is connected through said valve 22 to a further conduit 23 and thence to the rightward end of the power cylinder 24. The leftward end of the power cylinder 24 is connected by a conduit 26 to the leftward end of a chamber 27 in the distributor 28. The rightward end of said chamber 27 is connected by a conduit 29 to the inlet port 31c of a three-way valve 31. The outlet port 31b of said three-way valve is connected by a conduit 32 to the inlet 33a of a six-way valve 33, the outlet 33b of which is connected by a conduit 34 to the rightward end of the right hand chamber 36 in the distributor 28.

The outlet port 31a of the three-way valve 31 is connected by a conduit 37 to the middle port 38 in the chamber 36 of the distributor 28. The left hand port 39 of the chamber 36 is connected by a conduit 41 to the port 42 of the four-way valve 22 and the port 43 of said four-way valve is connected by a conduit 46 to the low pressure side of the system, in this case the reservoir 47.

A conduit including a check valve 48, sensed as shown, connects the chambers 27 and 36 of the distributor 28 as shown.

Turning now to a particular mechanism embodying this circuit and here chosen to illustrate the invention, a mounting bracket 51 (FIGURE 3) is fastened in any convenient manner, such as by screws of which one appears at 52, rigidly to the carriage 5. Said bracket 51 extends rearwardly to a point near the rearward end of the slide 1 whereupon it turns inwardly to provide an actuator-carrying portion 53. The inner end of said portion 53 rigidly supports the actuator carrier 54 which in turn pivotally supports a bell crank actuator 55 having if desired a roller 57 upon the rearwardmost end thereof.

The cylinder 24 (FIGURE 3) is rigidly mounted onto the bracket 51, by means including screws 58 and 59 which extend through suitable cylinder mounting means 61 and thence through the bracket 51 into the body of the carriage 5. The plunger 62 of said power cylinder 24 is rigidly affixed to a cross-head 63 which in turn is rigidly affixed in any desired manner, such as by a plurality of screws of which one is indicated at 64 (FIGURE 5), to the forward end of the slide 1. Thus, reciprocable actuation of said plunger 62 by the power cylinder 24 will result in reciprocation of the slide 1 with respect to the carriage 5.

The three-way valve 31 (FIGURE 3) is mounted rigidly onto the bracket 51 in any convenient manner, with its actuator 66 extending rearwardly through the portion 53 to a point rearwardly thereof. Said valve 31 is of such construction that the plunger 66 is normally in a rearward position whereby the ports 31a and 31c (FIGURE 1) of said valve are connected. Movement of said plunger 66 toward the valve (leftwardly as appearing in FIGURE 3) will effect a shifting of the valve 31 to connect ports 31a and 31b, while blocking port 31c.

Figure 9:
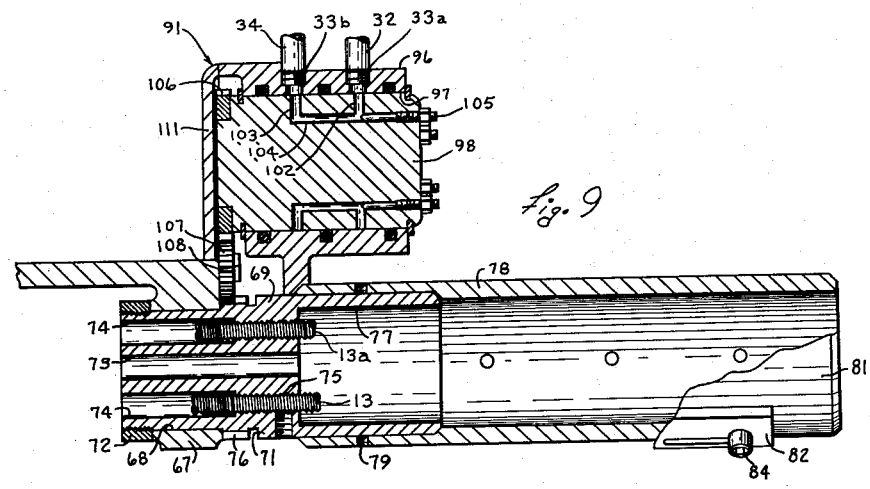
FIGURE 9 is an enlarged fragment of the rightward end of FIGURE 6 showing the retainer, the cam carrier and the control head separately from the rest of the apparatus.

Turning now to FIGURES 2 and 6, there is shown a bracket 67 at the rearward end of the slide 1 and extending downwardly therefrom. A cylindrical opening having a bearing surface 68 is provided within and through said bracket 67. A cylindrical retainer 69 is received rotatably within said bearing surface 68 and is held therein between a shoulder 71 and a nut 72. Said retainer has a keyed opening 73 extending therethrough which receives the rearward end of the indexing shaft 12 in nonrotatable relationship therewith. A plurality of pin-receiving openings, of which one is indicated at 74, are provided at equal radial and circumferential spacing (FIGURE 7) around the center of the opening 73. Said openings 74, which receive the several stop screws or pins, such as the pins 13 and 13a, have threaded sections 75 (FIGURE 9) at the rightward ends thereof. The number of pin or screw-receiving openings 74 is equal to the number of indexing positions of the turret 2 and said screws are coordinated therewith so that forward movement of the slide 1 will be limited by the contacting of a selected one of said limiting screws with the abutment 14 whereby to limit in a conventional manner the depth of cut provided in the workpiece by a given tool at a given time.

Turning now to the construction of said retainer 69 (FIGURE 9), it is provided with a toothed ridge around its periphery constituting the gear structure 76. Said gear structure is meshed with further gearing hereinafter described in detail. Said retainer 69 also has a rearwardly extending sleeve portion 77 which retains thereon a tubular cam holder 78. Suitable means, such as set screws of which one appears at 79, hold the cam holder in place on and with respect to the sleeve portion 77 of the retainer 69.

The cam holder 78 (FIGURE 4) is provided with a plurality of, here six, flats 81 onto which the cams are mounted, two of which cams appear at 82 and 83 (FIGURES 3, 6 and 7). Said cams are fastened into place by any suitable means such as the screws of which one appears at 84. Said cams are successively aligned in operative position (FIGURE 4) with respect to the roller 57 as said cam holder indexes in response to the indexing of the turret in a manner hereinafter described in more detail. The cam holder 78 is made hollow as shown to provide access therethrough to the several limiting screws, such as the limiting screws 13 and 13a appearing in FIGURE 6.

Mounted at the rearward end of the slide 1 and immediately above the gear portion 76 of the retainer 69 is the valve housing 91. Said valve housing is provided with openings 92 and 93 (FIGURE 7) through which suitable screws of which one is shown at 94 extend for fastening said valve housing onto said slide. The valve housing has a rearwardly extending portion 96 (FIGURE 6) within which is provided the valve bore 97.

The details of said valve are set forth in the application of William H. Buck Serial No. 841,222, filed September 19, 1959, now Patent No. 3,047,015 and assigned to the same assignee as the present application, and hence will be referred to here only briefly for purposes of convenient reference.

Within said valve bore 97 (FIGURE 9) is provided a valve core 98 of the valve 33 (FIGURE 1). Openings 33a and 33b (FIGURE 9) are provided through the side of the valve housing 96 for the connection thereto of the inlet conduit 32 and the outlet conduit 34, respectively. The valve core 98 is provided with six pairs of core inlet openings 102 and core outlet openings 103, each of which pairs is connected by a passageway 104 which is parallel to the axis of the valve core. An adjustable needle valve 105 is threadedly arranged to extend adjustably into each passageway 104 and vary the cross-sectional area available for the passage of fluid therethrough according to the position of said needle with respect to the ends of said respective passageways. Thus, indexing of the valve core in correlation with the indexing of the turret will place selected ones of the passageways 104 and the needle valves associated therewith in connecting relationship with the valve openings 33a and 33b. By suitably adjusting the several needle valves or stems 105, the rate of fluid flow between the conduits 32 and 34 can be adjusted as desired and in correlation with selected positions of the turret.

A gear 106 (FIGURE 7) is mounted at the leftward end of the core 98 and is fixedly arranged thereon. An idler gear 107 is mounted in any convenient manner, such as by a shouldered screw 108, upon the end of the slide 1 within the valve housing. Thus, rotation of the retainer 69 and the gear 76 carried thereby will act through the idler 107 to rotate correspondingly the valve core 98.

A valve cover 111 (FIGURE 9) closes the leftward opening of the valve housing 96 and is held in place by any convenient means, such as screws of which one appears at 112 (FIGURE 7).

Operation

Commencing with the pressure source P (FIGURE 1) suitably energized, the operator actuates the cycling valve 22 into the position shown in solid lines in FIGURE 1. This applies pressure fluid through the conduit 23 into the rightward end of the pressure cylinder 24 where it urges the plunger 62 in a leftward direction. This forces fluid out of the leftward end of said cylinder, the same having entered as a result of the preceding cycle, through the conduit 26 into the leftward end of the chamber 27. From said chamber 27 such fluid flows through the conduit 29 to the three-way valve 31 which, as above mentioned, is normally positioned so that the port 31a is connected to the port 31c. Fluid then flows through the conduit 37 into the chamber 36. The action of the check valve 48 prevents flow directly from the chamber 36 to the chamber 27. Since, as will be seen later, the conduit 34 connects only to the conduit 32 and the conduit 32 is blocked at the valve 31, pressure fluid in the chamber 36 at this point cannot flow out through the conduit 34. It will therefore flow only through the conduit 41 and thence through the four-way valve 22 and the low-pressure conduit 46 to the low-pressure side of the pressure system, here the tank 47. Thus, the liquid in the leftward side of the cylinder 24 can escape to the low-pressure side of the system and this permits the liquid in the high-pressure side of the cylinder to drive the plunger rapidly leftwardly.

The action of the plunger 62 (FIGURE 3) in moving leftwardly will act through the crosshead 63 to move the slide 1 leftwardly and thereby present whatever tool is carried on the leftwardmost face of the turret to the work at W. However, as the slide moves leftwardly, it carries the retainer 69 and cam holder 78 mounted thereon also leftwardly. Thus, at a desired point in said leftward travel, said point being selected by the position of the appropriate one of said cams on said cam holder, one of the cams, such as cam 83, will engage the roller 57 moving it outwardly and thereby moving the bell crank 56 in a counterclockwise direction as seen in FIGURE 3. This will actuate the valve plunger 66 and thereby shift the position of the three-way valve 31, which causes fluid in conduit 29 (FIGURE 1) now to travel into conduit 32 thence through the six-way valve 33 and through the conduit 34 to the chamber 36. The setting of the particular needle stem 105 (FIGURE 9) in the one of the passageways 104 which is at the moment connected between the conduits 32 and 34 will determine the rate at which said fluid passes therethrough and thereby determine the rate at which the plunger 62 continues to advance after the moment of actuation of the roller 57 by the one of the cams with which it is aligned. This then effects feeding of the tool to the work at a rate determined for a given position of the turret by the setting of an appropriate one of the needle stems 105.

When the work required of a given setting of the turret is completed, the operator then moves the cycling valve 22 into the position indicated by the broken lines in FIGURE 1. In this position, the pressure from the source is conducted into the conduit 41 thence through the chamber 36 and the check valve 48 into the chamber 27 thence through the conduit 26 into the leftward end of the cylinder 24. This provides a rapid retraction of the plunger 62 and of the slide and other structure associated therewith. Upon the retraction of said turret, it will normally engage the ratchet mechanism above mentioned in a known manner and effect an indexing thereof as desired, such indexing in the present illustrative embodiment being through an angle of 60 degrees of rotation.

Upon the attainment by the slide 1 of the desired rightward position, normally the full rightward position, the cycle will be ready to repeat. However, it will be observed that as the turret rotates as above set forth it will cause rotation of the indexing shaft 12 and thereby rotate the retainer 69 and present a different one of the limiting pins into alignment with the abutment 14. This will limit the leftward motion of the slide for the newly indexed position in a manner already well known to those skilled in the art. However, additionally, the rotation of the indexing shaft 12 will now also rotate the cam holder 78 and present another cam into alignment with the roller 57 and present another one of the passageways 104 and needle valve stem 105 associated therewith into connecting relationship between the passageways 32 and 34. With this new setting, the rapid advance of the slide toward the work will be slowed at a point as determined by the one of the cams now aligned with the roller 57, the rate of its continued advance leftwardly will now be determined by the setting of the needle valve stem associated with the passageway 104 which is now in connecting position between the conduits 32 and 34 and the limit of its advancing movement will be determined by the setting of that one of the limiting screws which is now in alignment with the abutment 14.

Accordingly the apparatus is ready for the next cycle and same will proceed in the same manner as above described upon appropriate actuation by the operator of the cycling valve 22, namely, by his returning it to the position shown in solid lines in FIGURE 1 of the drawings.

It will be apparent that any one of the several adjustments may be made independently of each of the other adjustments and that all of said adjustments can be made easily, quickly and without taking apart any of the units concerned. Particularly, each of the limiting screws may be reached through the interior of the cam holder 78 and the rearwardly extending sleeve portion 77 of the retainer 69. The several cams can be readily adjusted merely by loosening appropriate ones of the screws 84 and adjusting said cams longitudinally as desired followed by retightening of such of the loosened screws. The rate of feeding for the respective positions of the turret can be adjusted by adjusting the several ones of the needle valve stems 105 which stems extend through the rightward side of the valve housing as shown in the drawings.

Modifications

The valve housing 91 (FIGURE 10), described above in detail with respect to FIGURE 6, may be modified for the purpose of mounting an electrical switch device 121 thereon. The cover plate 111 (FIGURE 6) is removed from the valve housing 91 and replaced by a switch housing 122 (FIGURE 10) which is secured thereto by means of bolts 123 (FIGURE 11) which extend through the mounting plate 124 on the switch housing 122 into the openings 92 and 93 (FIGURE 7) of the valve housing 91.

The valve core 126 in the valve housing 91 (FIGURE 10) has a coaxial, keyed recess 127 in its exposed leftward face into which a switch shaft 128 is snugly received for rotation with the core 126. The leftward end of the shaft 128 is centered and steadied by the bolt 129 threadedly received through the end wall 131 of the housing 122. A plurality of switch cams 132, having switch actuating screws 133 threadedly received into their peripheries, are mounted upon and rotatable with the shaft 128.

Figure 12:
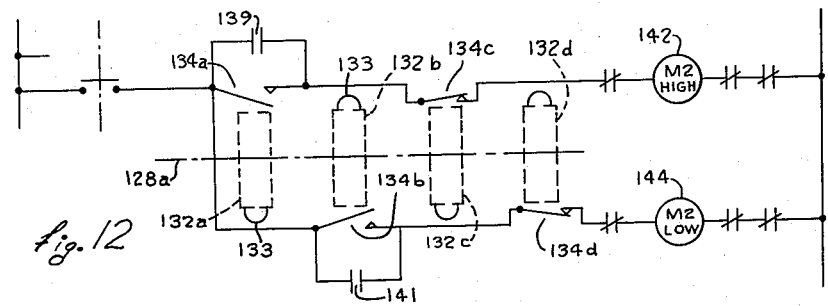
FIGURE 12 is a diagram illustrating one application of the switching device of FIGURE 10.
Figures 10, 11:
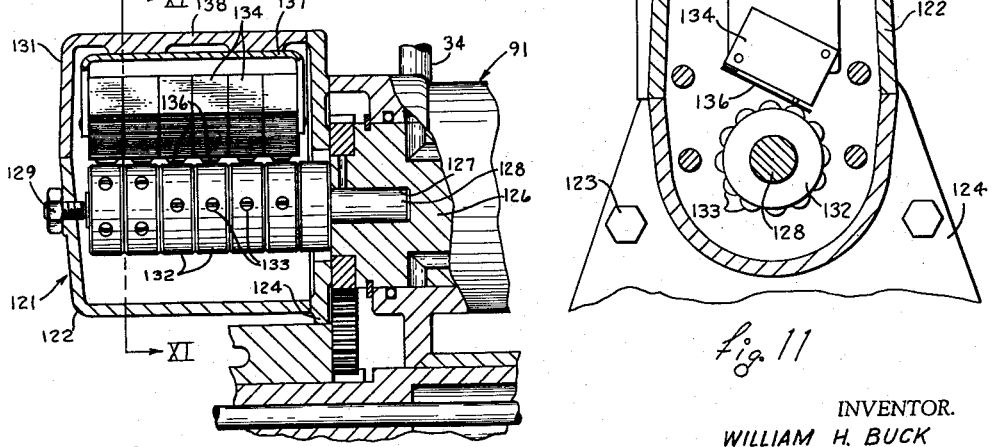
FIGURE 10 is a broken fragment of FIGURE 2 including also an electrical switching device coupled with the apparatus.
FIGURE 11 is a sectional view taken along the line XI—XI in FIGURE 10.

A plurality of switches 134 (FIGURE 10), such as micro-switches having switch actuators 136, are supported within the housing 122 by a yoke 137, which is secured to the upper wall 138 of the housing 132. The switches 134 are located so that, as shown in FIGURE 11, their actuators 136 will be engaged by the screws 133 at the selected moment for operating said switches 134. The switches 134 may be connected in a conventional manner by conductors (not shown) into a circuit of any kind, such as that shown in FIGURE 12. More particularly, the circuit of FIGURE 12 includes four switches 134a, 134b, 134c and 134d which are operated by the switch cams 132a, 132b, 132c and 132d, respectively, which are mounted upon the switch shaft indicated by the broken line 128a.

By appropriate arrangement, switches 134a and 134b are normally open and have self-locking relays 139 and 141 which are closed by a momentary closing of the switches 134a and 134b, in response to actuation by the switch cams 132a and 132b. The switches 134c and 134d are normally closed and are momentarily opened by their switch cams 132c and 132d.

The switches 134a and 134c (FIGURE 12) are in series with the high-speed control 142 for drive means (not shown) associated with the chuck 143 (FIGURE 2) for rotating the work W. The switches 134b and 134d (FIGURE 12) may be in series with the low-speed control 144 for said chuck 143 (FIGURE 2). By appropriate timing of the switch cams 132a, 132b, 132c and 132d, the switches 134a and 134d can be operated simultaneously to energize the high-speed control 142 and deenergize the low-speed control 144. Alternatively, and at a later time, the switches 134b and 134c can be simultaneously operated by their appropriate cams 132b and 132c to simultaneously energize the low-speed control circuit and deenergize the high-speed control circuit.

Accordingly, it will be seen that by appropriate timing of the switch cams 132 (FIGURE 10), the switch device 121 can be utilized to adjust the rotational speed of the chuck 143 to the type of tool mounted in the turret head 2 and engaging the work W for any particular position of the turret head. Moreover, since the shaft 128 is rotated with the core 126 in response to the indexing of the turret 2 (FIGURE 2) the chuck control will be responsive to the particular position of the turret head. It will be apparent that other similar uses may be made of the switch device 121 or a similar switch device which is coupled with the core 126.

Although a particular preferred embodiment of the invention has been disclosed above it will be understood that variations or modifications of such disclosure which lie within the scope of the appended claims are fully contemplated.

What is claimed is:

1. A feeding control for a machine tool having a rotatable turret, comprising: a source of fluid pressure; piston and cylinder means for effecting relative feeding movement between the work and the turret, said cylinder means including first conduit means connected to one end thereof and second conduit means connected to the other end thereof; first valve means having an inlet connected to said first conduit means and having first and second outlets, said valve having a first position wherein it connects said inlet to said first outlet and a second position connecting said inlet to said second outlet; third conduit means connected to said first outlet; second valve means and fourth conduit means connecting same in series between said second outlet of said first valve means and said third conduit means, said second valve means including a plurality of adjustable flow control paths individually selectable with each position of said turret whereby the flow of pressure fluid from said one end of said cylinder through said first conduit means is adjustably controlled; valved means connecting said first conduit means to said third conduit means; and means responsive to a predetermined relative movement between said turret and the work toward each other for moving said first valve means from its first to its second position.

2. A feeding control for a machine tool having a rotatable turret, comprising: a base; a slide slidably mounted on said base, said turret being rotatably mounted on said slide; a cylinder mounted on said base and having a reciprocable piston therewithin connected to said slide whereby supply of fluid pressure to said cylinder effects movement of said slide with respect to said base; a source of pressure fluid; a first valve mounted on said base and having an inlet and first and second outlets; an actuator on said valve for connecting said inlet to one of said outlets; a first conduit means connected between one end of said cylinder and the inlet of said first valve; second conduit means connected to the other end of said cylinder and connectible to said source; third conduit means connected to said first outlet and connectible to said source; a rate selector valve mounted on said slide and connected by fourth conduit means in series between said second outlet and said first and third conduit means, said rate selector valve including a plurality of adjustable paths which may be selectively placed in circuit with said first valve and said one end of said cylinder; a shaft extending along and mounted on said slide and drivingly connected to said turret whereby rotation of said turret effects rotation of said shaft; gear means mounted on said shaft and drivingly connecting same to said rate selector valve whereby rotation of said turret operates said rate selector valve to place one of said paths in circuit; a cam holder mounted on said shaft, said cam holder having a series of circumferentially spaced cams thereon, said cam holder being rotatable with said shaft to place one of said cams in longitudinal alignment with said actuator in each position of said turret whereby upon predetermined movement of said slide with respect to said base, said actuator will connect said first conduit means to said second valve means.

3. A feeding control according to claim 2 including a plurality of electrical switches mounted on said second valve and actuating means for said switches operated by said gear means.

4. In a turret lathe having a turret supported upon a bed for reciprocable movement with respect to said bed, a device for controlling said movement comprising:
   piston and cylinder means connected between said turret and said bed for effecting relative movement therebetween;
   first conduit means connected to one end of said cylinder;
   first valve means having an inlet port and first and second outlet ports, said inlet port being normally connected through said valve means to said first outlet port;
   actuating means on said first valve means connecting said inlet port through said valve means to said second outlet port, said actuating means being operated in response to movement of said piston as it approaches the other end of said cylinder;
   second conduit means connecting said inlet port of said first valve to said other end of said cylinder;
   second valve means;
   third conduit means connected through said second valve means between the first and second outlet ports of said first valve means, the rate of fluid flow through the second valve means being substantially less than the rate of fluid flow through the first valve means;
   fourth conduit means connected near one end to said third conduit means;
   means defining a passageway between said second and fourth conduit means;
   check valve means arranged in said passageway for positively opposing the flow of pressure fluid from said second conduit means into said third and fourth conduit means; and
   third valve means for alternatively connecting said first and fourth conduit means to a source of pressure fluid, so that connection of said source of pressure fluid to said first conduit means causes said piston to move toward the other end of said cylinder at a relatively fast rate until said actuating means is operated after which said piston is moved at a relatively slow rate, and connection of said source of pressure fluid to said fourth conduit means causes said piston to move toward said one end of said cylinder at a relatively fast rate.

5. In a turret lathe having a turret supported upon a bed for reciprocable movement with respect to said bed, a device for controlling said movement comprising:
   piston and cylinder means connected between said turret and said bed for effecting relative movement therebetween;
   first conduit means connected to one end of said cylinder;
   first valve means having an inlet port and first and second outlet ports, said inlet port being normally connected through said valve means to said first outlet port;
   actuating means on said first valve means connecting said inlet port through said valve means to said second outlet port, said actuating means being operated in response to movement of said piston as it approaches the other end of said cylinder;
   second conduit means connecting said inlet port of said first valve means to said other end of said cylinder;
   second valve means having an inlet connected to said second outlet port;
   third conduit means connected at one end to an outlet from said second valve means, the rate of fluid flow through the second valve means being substantially less than the rate of fluid flow through the first valve means;
   fourth conduit means connected between a point in said third conduit means and the first outlet port in said first valve means;
   means defining a passageway between said second and third conduit means near said point;
   check valve means arranged in said passageway for positively opposing the flow of pressure fluid from said second conduit means into said third and fourth conduit means; and
   third valve means for alternatively connecting said first and third conduit means to a source of pressure fluid, whereby connection of said source of pressure fluid to said first conduit means causes said piston to move toward the other end of said cylinder at a relatively fast rate until said actuating means is operated after which said piston is moved at a relatively slow rate, and connection of said source of pressure fluid to said third conduit means causes said piston to move toward said one end of said cylinder at a relatively fast rate.

6. In a turret lathe having a turret supported upon a bed for reciprocable movement with respect to said bed, a device for controlling said movement comprising:
   piston and cylinder means connected between said turret and said bed for effecting relative movement therebetween;
   first conduit means connected to one end of said cylinder;
   means defining first and second chambers connected by a passageway;
   check valve means in said passageway for positively opposing the flow of pressure fluid from said second chamber into said first chamber;
   second conduit means connecting said second chamber to the other end of said cylinder;
   first valve means having an inlet port and first and second outlet ports, said inlet port being normally connected through said valve means to said first outlet port;
   actuating means on said first valve means connecting said inlet port through said valve means to said second outlet port, said actuating means being operated in response to movement of said piston as it approaches the other end of said cylinder;
   third conduit means connecting said inlet port of said first valve to said second chamber;
   second valve means;
   fourth conduit means connected through said second valve means between the second outlet port of said first valve means and said first chamber, the rate of fluid flow through the second valve means being substantially less than the rate of fluid flow through the first valve means;
   fifth conduit means connected between said first outlet port of said first valve means and said first chamber; and
   third valve means for alternatively connecting said first conduit means and said first chamber to a source of pressure fluid, whereby connection of said source of pressure fluid to said first conduit means causes said piston to move toward the other end of said cylinder at a relatively fast rate until said actuating means is operated after which said piston is moved at a relatively slow rate, and connection of said source of pressure fluid to said first chamber causes said piston to move toward said one end of said cylinder at a relatively fast rate.

References Cited in the file of this patent
UNITED STATES PATENTS

| | | |
|---|---|---|
| 2,562,266 | Gamble | July 31, 1951 |
| 2,642,649 | Shadrick | June 23, 1953 |
| 2,776,584 | Burg | Jan. 8, 1957 |
| 2,871,882 | Eliasson | Feb. 3, 1959 |
| 2,934,812 | Allen | May 3, 1960 |
| 2,952,168 | Leifer | Sept. 13, 1960 |